United States Patent [19]
Lieverz et al.

[11] Patent Number: 6,080,296
[45] Date of Patent: Jun. 27, 2000

[54] PROCESS FOR THE PRODUCTION OF MULTI-LAYER LACQUER COATINGS ON ELECTRICALLY CONDUCTIVE SUBSTRATES

[75] Inventors: Frank Lieverz; Volker Dücoffre; Andreas Runkel, all of Wuppertal; Herbert Kälke, Mülheim an der Ruhr; Wolfgang Göldner, Velbert; Walter Schubert, Wuppertal, all of Germany

[73] Assignee: Herberts GmbH, Wuppertal, Germany

[21] Appl. No.: 09/202,628

[22] PCT Filed: Jun. 7, 1997

[86] PCT No.: PCT/EP97/02974

§ 371 Date: Jul. 27, 1999

§ 102(e) Date: Jul. 27, 1999

[87] PCT Pub. No.: WO97/47402

PCT Pub. Date: Dec. 18, 1997

[30] Foreign Application Priority Data

Jun. 12, 1996 [DE] Germany .............. 196 23 369
Jul. 12, 1996 [DE] Germany .............. 196 28 361

[51] Int. Cl.$^7$ ...................................... C25D 13/00
[52] U.S. Cl. ...................... 204/488; 204/486; 427/409
[58] Field of Search ................... 204/488, 486; 427/409

[56] References Cited

U.S. PATENT DOCUMENTS 4,851,460  7/1989  Stranghoner ............... 523/407
5,342,882  8/1994  Gobel ....................... 524/832
5,589,228  12/1996  Wegner ..................... 524/460

FOREIGN PATENT DOCUMENTS

0 265 363 A3  4/1988  European Pat. Off. .
40 00 889 A1  7/1991  Germany .
42 23 182 C1  7/1993  Germany .
WO 91/12899  9/1991  WIPO .

*Primary Examiner*—Kishor Mayekar
*Attorney, Agent, or Firm*—Pillsbury Madison & Sutro LLP

[57] ABSTRACT

A method of applying several coats to an electrically conducting substrate by applying a primer coat using electrophoresis, stoving the primer coat, applying directly to the stoved primer coat a colored and/or special effect coating layer made of an aqueous coating material containing color and/or special effect pigments and including as a binder: A) 50 to 85% by weight of one of more hybrid binder vehicles based on polyesters and on (meth)acrylic copolymers with a hydroxyl number of 100 to 350 mg KOH/g and an acid number of 20 to 60 mg KOH/g; B) 0 to 20% by weight of one or more of binder vehicles which are different from A); and C) 15 to 50% by weight of one or more free or blocked polyisocyanates and/or one or more triazine-based components which crosslink with the hydroxyl groups of component A) with the formation of ether and/or ester groups, at least 50% by weight of the (meth)acrylic copolymers of component A) being produced in the presence of at least 20% by weight of the polyester or polyesters of component A).

16 Claims, 2 Drawing Sheets

FIG.1

PROCESS FOR THE PRODUCTION OF MULTI-LAYER LACQUER COATINGS ON ELECTRICALLY CONDUCTIVE SUBSTRATES

This application is the national phase of international application PCT/EP97/02974 filed Jun. 7,1997.

FIELD OF THE INVENTION

This invention relates to a process for the production of multi-layer lacquer coatings on conductive substrates, e.g. on metallic substrates, particularly for the lacquer coating of motor vehicles, and relates to the use of the process within a lacquer coating installation which is operated on an industrial scale, and particularly to the use thereof in an installation for the mass-production lacquer coating of automobiles.

BACKGROUND OF THE INVENTION

Current, high-quality mass-produced lacquer coatings for motor vehicles generally consist of an electrophoretically deposited primer which provides protection from corrosion and from stone impact, a subsequent primer surfacer coat which provides protection from stone impact and which smooths the surface, and of a two-layer coating which is applied subsequently for decorative purposes and which comprises a colour- and/or effect-imparting base lacquer coat and a protective clear lacquer coat which seals the surface. In practice, lacquer coating installations are often operated with a plurality of pigmented primer surfacers of different pigmentations, the colour shade of which is matched to that of the subsequent covering lacquer coating, and with a number of single-colour and effect base lacquers which determines the colour shade programme of the lacquer coating operation.

EP-A-0 265 363 describes a process for the prevention of yellowing of a multi-layer coating, wherein a primer in the form of a stoved cathodic dip lacquer, which contains special blocked polyisocyanates as crosslinking agents, is overcoated by the wet-into-wet method with a commercially available pigmented base lacquer and with a commercially available clear lacquer. The primer surfacer coat is omitted. Within the scope of the present invention, it has been shown that the direct overcoating of a stoved electro-dip lacquer coat with a two-layer coating comprising a customary solvent-based base lacquer, which is based on acrylic resins or polyester resins and which crosslinks with melamine resin, and a customary clear lacquer, results in a multi-layer coating which does not achieve the level of properties which is currently required for the original lacquer coatings of motor vehicles, particularly as regards the level of stone chip protection.

Aqueous coating media are known from DE-C-42 23 182 which contain polyester oligomer polyacrylates as binder vehicles and which are obtained by the copolymerisation, by a radical mechanism, of at least one hydroxy-functional ester of (meth)acrylic acid, at least one alpha,beta-ethylenically unsaturated carboxylic acid and optionally of one or more alpha,beta-ethylenically unsaturated monomers without hydroxyl groups and without carboxyl groups, in the presence of at least one hydroxy-functional polyester oligomer. These aqueous coating media are outstandingly suitable as aqueous clear lacquers, such as those which are used as covering lacquers for multi-layer lacquer coatings in the automobile industry. These coating media can also be used in pigment-containing form as colouring base lacquers which are overcoated with clear lacquers.

For reasons of efficiency and of achieving savings in materials, there is a desire in motor vehicle lacquer coating operations for a reduction of the number of operations and of the number of lacquer coats and for a reduction in the coat thickness of the lacquer structure, without incurring losses in the customary overall level of properties, however.

SUMMARY OF THE INVENTION

The object of the present invention is to provide a process for the production of multi-layer lacquer coatings, particularly motor vehicle lacquer coatings, which have a visual surface quality as regards flow and covering lacquer condition which is outstanding or which is improved compared with multi-layer lacquer coatings produced according to the prior art. As far as possible, the multi-layer lacquer coatings produced by this process should be suitable for being produced from a reduced number of operations, and according to one process variant at least should also be suitable for being produced with a reduced number of lacquer coats, and should preferably also comprise a reduced coat thickness of the overall lacquer structure, wherein a comparable or improved overall level of properties should be obtained compared with prior art multi-layer lacquer coatings. The process should also, from a logistics point of view, make it possible to simplify the operation of an industrial mass-production lacquer coating installation in which substrates are provided side by side with single-colour multi-layer coatings and with effect multi-layer coatings.

It has been shown that this object can surprisingly be achieved by the process, to which the present invention firstly relates, for the multi-layer lacquer coating of an electrically conductive substrate by the electrophoretic deposition of a primer, stoving the primer coat obtained, direct application of a colour- and/or effect-imparting coating layer to the stoved primer coat and further overcoating of the colour- and/or effect-imparting coating layer, which is characterised in that the colour- and/or effect-imparting coating layer is produced from an aqueous coating medium (I) which contains colouring- and/or effect pigments and which contains, as binder vehicles:

A) 50 to 85% by weight of one or more hybrid binder vehicles based on polyesters and on (meth)acrylic copolymers with a hydroxyl number of 100 to 350 mg KOH/g and an acid number of 20 to 60 mg KOH/g, B) 0 to 20% by weight of one or more of binder vehicles which are different from A), C) 15 to 50% by weight of one or more free or blocked polyisocyanates and/or one or more triazine-based components which crosslink with the hydroxyl groups of component A) with the formation of ether and/or ester groups, wherein the sum of components A), B) and C) adds up to 100% by weight of binder vehicle solids, and wherein at least 50% by weight of the (meth)acrylic copolymers of component A) have been produced in the presence of at least 20% by weight of the polyester or polyesters of component A).

The colour- and/or effect-imparting coating layer of aqueous coating medium (I) which is applied to the electrophoretically deposited primer coat directly, without the application of further intermediate coats, can either a) be provided with an effect-imparting and/or optionally colour-imparting base lacquer coat (an effect base lacquer coat) which determines the effect colour shade of the multi-layer coating, or b) is provided with a clear lacquer coat only. If procedure a) is employed, the effect- and/or optionally colour-imparting base lacquer coat is the coating layer which determines the effect colour shade of the multi-layer coating, whilst if procedure b) is employed it is the colour- and/or effect-imparting coating layer of aqueous coating medium (I) which is applied to the electrophoretically deposited primer coat directly, without the application of further intermediate coats, which determines the colour shade (effect colour shade or single-colour shade) of the multi-layer coating. When an effect multi-layer coating is produced, procedure a) is preferably employed in the process according to the invention, i.e. the effect colour shade of the multi-layer coating is determined by the effect base lacquer coat and aqueous coating medium (I) is preferably of single-colour pigmentation. On the other hand, if single-colour multi-layer coatings are to be produced, procedure b) is preferably employed in the process according to the invention, wherein aqueous coating medium (I) is of single-colour pigmentation, is provided with a clear lacquer coat only, and thus determines the single-colour shade of the multi-layer coating.

The process according to the invention is surprisingly well suited to the production of multi-layer coatings with an outstanding visual surface quality if aqueous coating medium (I) is applied to the electrophoretically deposited primer coat directly, without the application of further intermediate coats.

The process according to the invention offers a particular potential for improving efficiency if the substrates which are to be provided with multi-layer coatings, preferably automobile bodies for example, are to be produced in a plurality of different colour shades within one lacquer coating installation, particularly in the context of a colour shade programme which is composed of a multiplicity of single-colour shades and effect colour shades. From a logistics point of view, the process according to the invention can make it possible to simplify the operation of an industrial mass-production lacquer coating installation. Therefore, the present invention further relates to the use, which is particularly advantageous and preferred as regards logistics, of the process according to the invention in a mass-production lacquer coating installation, wherein aqueous coating medium (I), which is to be applied directly to the electrophoretically deposited primer coat, is processed in a multiplicity of single-colour shades which determine the single-colour shade programme and the substrates, preferably automobile bodes, which are thus obtained and which are coated with a plurality of different single-colour shades are either provided with a clear lacquer coat only (procedure b) as explained above) or, if an effect multi-layer coating is to be produced, are provided with a two-layer covering lacquer coating consisting of an effect base lacquer coat and of a clear lacquer coat (procedure a) as explained above). Therefore, the present invention relates in a preferred manner to the operation of the process according to the invention within an industrial-scale mass-production lacquer coating installation in which substrates are to be produced with effect multi-layer coatings in addition to substrates with single-colour multi-layer coatings, wherein procedures a) and b) as explained above are employed in parallel, in each case with a single-colour aqueous coating medium (I), preferably with a plurality of aqueous coating media (I) which are each of a different single-colour shade. In this respect, the different single-colour shades preferably correspond to the multiplicity of single-colour shades (the single-colour shade programme) which is provided for the substrates, and thus preferably comprise single-colour shades which are well matched to the effect colour shades of the effect base lacquers which are applied to the proportion of substrates which are to be provided with an effect multi-layer coating.

It has been shown that the process according to the invention can be employed particularly advantageously for motor vehicles and parts thereof. The process according to the invention enables multi-layer coatings to be produced which are distinguished by their outstanding visual surface quality.

Within the scope of the process according to the invention, all anodically or cathodically depositable electro-dip lacquers which are known in the art can be used for the production of an electrophoretically deposited primer. Examples thereof include aqueous coating media with a solids content of up to 50% by weight, for example 10 to 50% by weight, particularly 10 to 30% by weight. The solids content is formed from binder vehicles which are customary for electro-dip lacquer coating and which comprise ionic groups or groups which can be converted into ionic groups and which also optionally comprise groups which are capable of effecting chemical crosslinking, as well as crosslinking agents, pigments, extenders and/or customary lacquer additives which may optionally be present. The ionic groups or groups which can be converted into groups can be anionic groups or groups which can be converted into anionic groups, e.g. acidic groups such as —COOH groups, or can be cationic groups or groups which can be converted into cationic groups e.g. basic groups such as amino groups or ammonium groups, e.g. quartemary ammonium groups, phosphonium groups and/or sulphonium groups. Binder vehicles comprising basic or cationic groups are preferred. Basic groups which contain nitrogen are particularly preferred. These groups can exist in quaternarised form, or can be converted, at least in part, into ionic groups, with a customary neutralising agent such as an acid, e.g. an organic monocarboxylic acid such as formic acid or acetic acid.

Customary anodically depositable electro-dip lacquer binder vehicles and lacquers (ADLs) which contain anionic groups can be used, for example, for the production of the electro-dip lacquer coat. Examples thereof include binder vehicles based on polyesters, epoxy resins, poly(meth) acrylates, maleate oils or polybutadiene oils with a weight average molecular weight of 300 to 10,000, for example, and an acid number of 35 to 300 mg KOH/g. The binder vehicles may comprise $-COOH$, $-SO_3H$ and/or $-PO_3H_2$ groups for example. The resins can be converted into the aqueous phase after neutralisation of at least part of the acidic groups. The binder vehicles can be self-crosslinking or externally crosslinkable. Therefore, the lacquers can also contain customary crosslinking agents, e.g. triazine resins, crosslinking agents which contain groups which are capable of transesterification, or blocked polyisocyanates. Particular examples of anodically depositable electro-dip lacquer binder vehicles and lacquers (ADLs) such as these, which contain anionic groups and which can be used in the process according to the invention, are described in DE-A-28 24 418.

Cathodic electro-dip lacquers (CDLs) based on cationic or basic binder vehicles are preferably used in the process according to the invention, however. Examples of basic resins such as these include resins which contain primary, secondary or tertiary amino groups, the amine numbers of which range from 20 to 250 mg KOH/g, for example. The weight average molecular weight (Mw) of these base resins is preferably 300 to 10,000. Examples of base resins such as these include amino(meth)acrylate resins, aminoepoxy resins, aminoepoxy resins comprising terminal double bonds, aminoepoxy resins comprising primary OH groups, aminopolyurethane resins, polybutadiene resins which contain amino groups, or modified epoxy resin-carbon dioxide-amine reaction products. These base resins can be self-crosslinking or are used in admixture with known crosslinking agents. Examples of crosslinking agents such as these include the amino plastic resins which are familiar to one skilled in the art, blocked polyisocyanates, crosslinking agents comprising terminal double bonds, polyepoxide compounds, or crosslinking agents which contain groups which are capable of transesterification.

The base resins and crosslinking agents which can be employed in cathodic dip lacquer (CDL) baths which can be used according to the invention are the customary ones which are familiar to one skilled in the art. They are known, for example, from the extensive patent literature.

Resins such as these can be used on their own or in admixture. What are termed "non-yellowing" CDL systems are preferably used; these are systems which prevent yellowing or discoloration of the multi-layer coating during stoving. Examples thereof include CDL systems which crosslink by means of specially selected blocked polyisocyanates, such as those described in EP-A-0 265 363.

In addition to the base resin and to the crosslinking agent which is optionally present, the electro-dip lacquer (EDL) coating medium may contain pigments, extenders and/or customary lacquer additives. Suitable pigments and extenders include the customary inorganic and/or organic pigments and extenders. Examples include carbon black, titanium dioxide, iron oxide pigments, phthalocyanine pigments, quinacridone pigments, kaolin, french chalk and silica.

The pigments can be dispersed to form pigment pastes, e.g. by using known paste resins. Resins such as these are familiar to one skilled in the art. Examples of paste resins which can be used according to the invention in CDL baths are described in EP-A-0 183 025 and in EP-A-0 469 497.

Customary additives such as those which are known in particular for EDL coating media can be used as additives. Examples thereof include the customary additives which are familiar to one skilled in the art, such as wetting agents, neutralising agents, flow enhancers, catalysts, corrosion inhibitors, anti-foaming agents, solvents, and light stabilisers, optionally in combination with antioxidants.

Primers are deposited on to the electrically conductive, e.g. metallic, substrate from the electrodip lacquer baths, by electrophoretic deposition in the known manner, to give a dry coat thickness of 15 to 30 $\mu$m for example. Non-adhering lacquer residues can then be rinsed off if necessary. The lacquer coat obtained is then stoved and chemically crosslinked at an elevated temperature of up to 180° C. for example, before a colour- and/or effect-imparting coating layer of aqueous coating medium (I) is applied according to the invention without the application of further intermediate coats. Aqueous coating medium (I) contains, as binder vehicles, the combination of components A), B) and C) as defined above.

Binder vehicles A) are termed hybrid binder vehicles, since they are based on polyesters as well as (meth)acrylic copolymers. The polyesters may for example have a calculated molecular weight of 200 to 3000. They have a hydroxyl number of 100 to 600 mg KOL/g and an acid number of 0 to 50 mg KOH/g for example. They can be used, for example, as oligoesters with a calculated molecular weight of 200 to 1000 or as polyesters with a calculated molecular weight of 1000 to 3000. The hybrid binder vehicles have a hydroxyl number of 100 to 350, preferably 120 to 200 mg KOH/g, and an acid number of 20 to 60, preferably of 25 to 40 mg KOH/g, and are preferably composed of 30 to 95% by weight of (meth)acrylic copolymers and of 5 to 70% by weight of oligo- and/or polyesters, preferably of oliaoesters only. They can be obtained by the polymerisation, by a radical mechanism and in the presence of one or more hydroxy-functional oligo- and/or polyesters, of one or more esters of unsaturated carboxylic acids which comprise hydrophobic and hydrophilic constituents, wherein a) the hydrophobic constituents are based on monomeric esters of unsaturated carboxylic acids comprising secondary OH groups, which can be present in admixture with comonomers which are free from OH groups, and b) the hydrophilic constituents are based on monomeric esters of unsaturated carboxylic acids comprising primary OH groups, which can be present in admixture with comonomers which are free from OH groups. The numerical ratio of primary to secondary OH groups, which originate from components a) and b), in the copolymer is preferably between 1:1.5 and 1:2.5. At least 50% by weight of the (meth)acrylic copolymers are produced in the presence of at least 20% by weight of the oligo- and/or polyester or oligo- and/or polyesters.

The oligoesters which can be used, for example, are obtainable by the polycondensation of diols and/or polyols and polycarboxylic acids, preferably dicarboxylic acids, and/or derivatives thereof, optionally with the use in conjunction of one or more hydroxycarboxylic acids, one or more monoalcohols and/or monocarboxylic acids, and they have a calculated molecular weight of 200 to 1000, preferably 300 to 600, a hydroxyl number of 100 to 600, preferably 200 to 500 mg KOH/g. and an acid number of 0 to 15, preferably 0 to 1.5 mg KOH/g.

The polyesters which can be used, for example, are obtainable by the polycondensation of diols and/or polyols and polycarboxylic acids, preferably dicarboxylic acids, and/or derivatives thereof, optionally with the use in conjunction of one or more hydroxycarboxylic acids, one or more monoalcohols and/or monocarboxylic acids, and they have a calculated molecular weight of 1000 to 3000, preferably less than 2000, a hydroxyl number of 100 to 400, preferably 150 to 250 mg KOH/g, and an acid number of 0 to 50, preferably 10 to 40, most preferably 20 to 35 mg KOH/g.

For example, the oligo- and/or polyesters which are used for the production of component A) can be produced by the condensation of one or more diols and/or polyols, optionally in the presence of one or more monoalcohols, with one or more polycarboxylic acids, preferably dicarboxylic acids and/or derivatives thereof, and optionally also with one or more monocarboxylic acids and hydroxycarboxylic acids. Polycondensation is effected by the customary methods familiar to one skilled in the art, for example in the presence of customary esterification catalysts and at elevated temperatures, e.g. 180 to 230° C., in the melt.

Examples of polyols which can be used include those which comprise more than two OH groups, such as aliphatic triols and tetrols comprising 2 to 6 carbon atoms, e.g. trimethylolethane, trimethylolpropane, glycerol, 1,2,4-butanetriol, 1,2,6-hexanetriol and pentaerythritol. It is also possible to use one or more monofunctional alcohols in conjunction, such as monoalkanols which comprise 1 to 20 C atoms in their alkyl radical. Examples thereof include methanol, ethanol, isopropanol, lauryl alcohol and stearyl alcohol.

Examples of diols which can be used include aliphatic diols such as ethylene glycol, propylene glycol (1,3 and 1,2), butanediol, hexanediol-(1,6), neopentyl glycol, 2-butyl-2-ethylpropanediol-1,3; polyether glycols of ethylene and propylene comprising up to 6 monomer components, such as diethylene glycol, triethylene glycol, tetraethylene glycol and hexaethylene glycol; and cycloaliphatic diols such as 1,3-dimethylolcyclohexane and 1,4-dimethylolcyclohexane.

Dimethylolpropionic acid is a preferred example of a hydroxycarboxylic acid which can be used.

Examples of polycarboxylic acids and of the preferred dicarboxylic acids include trimellitic acid, aliphatic saturated and unsaturated dicarboxylic acids, such as maleic acid, fumaric acid, succinic acid, adipic acid, azelaic acid and sebacic acid; cycloaliphatic saturated and unsaturated dicarboxylic acids and aromatic dicarboxylic acids, such as phthalic acid, isophthalic acid, tetraand hexahydrophthalic acids and cyclohexane-dicarboxylic acid (1,2, 1,3 and 1,4), itaconic acid and the possible anhydrides thereof. It is also possible to use mono-functional carboxylic acids in conjunction, such as acetic acid, propionic acid, benzoic acid or stearic acid.

Monomers a) and b) are used in amounts such that the hybrid binder vehicle based on oligo- and/or polyesters and on (meth)acrylic copolymers which is obtained has a hydroxyl number of 100 to 350, preferably 120 to 200, and an acid number of 20 to 60, preferably 25 to 40 mg KOG/g.

The expression "(meth)acrylic" which is used in the present description and in the claims is a synonym for "acrylic and/or methacrylic".

Binder vehicle component A) can be produced by the polymerisation of components a) and b) in the oligo- and/or polyester or oligo- and/or polyesters.

During the preparation of binder vehicle component A), at least 50% by weight, preferably more than 70% by weight, of the total amount of (meth)acrylic copolymer, and most preferably the total amount thereof, is produced in the presence of at least 20% by weight, preferably more than 30% by weight, most preferably more than 40% by weight, of the oligo- and/or polyester or oligo- and/or polyesters. If a plurality of oligo- and/or polyesters is used, these can be present as a mixture during the production of the (meth)acrylic copolymer, or some or part of the oligo- and/or polyesters can be used and the remainder can be added later. The (meth)acrylic copolymers can be produced by polymerisation by a radical mechanism. In this method, at least 20% by weight, preferably more than 30% by weight, most preferably more than 40% by weight of the oligo- and/or polyester or oligo- and/or polyesters is placed in the reaction vessel, optionally in admixture with suitable organic solvents, and is heated to the reaction temperature, and at least 50% by weight, preferably more than 70% by weight, most preferably the total amount of the monomer mixture for the synthesis of the (meth)acrylic copolymer, which mixture optionally contains radical initiators, is added. Any residual amount of the monomer mixture, which optionally contains radical initiators, for the synthesis of the (meth) acrylic copolymer can be polymerised by a radical mechanism in the same manner, wherein it is only organic solvents which are placed in the reaction vessel, without constituents of the oligo- and/or polyester or oligo- and/or polyesters, and are heated to the reaction temperature, after which the procedure is as described above. The (meth)acrylic copolymer which is obtained by the polymerisation of the residual amount of monomer mixture which possibly remains can be admixed with the (meth)acrylic copolymer which is synthesised in the presence of the oligo and/or polyester or oligo- and/or polyesters.

For example, a procedure is most preferably used in which the total amount of the 5 to 70% by weight of the hydroxy-functional oligo- and/or polyester or oligo- and/or polyesters of component A) is placed in the reaction vessel and the total amount of esters of unsaturated carboxylic acids comprising hydrophobic and hydrophilic constituents, based on components a) and b) as defined above, which are required for the production of the 95 to 30% by weight of the (meth)acrylic copolymer or copolymers of component A), is polymerised therein. The parts by weight of components a), b) and oligo- and/or polyesters add up to 100 parts by weight here. The quantitative proportions of components a) and b) are preferably selected so that the numerical ratio of primary to secondary OH groups in the (meth)acrylic copolymer obtained (without taking into account the OH groups of the oligo- and/or polyester or oligo- and/or polyesters) ranges from 1:1.5 to 1:2.5.

The (meth)acrylic copolymer is produced, as described above, in the presence of partial amounts at least of the oligo- and/or polyester or oligo- and/or polyesters, which can be placed in the reaction vessel dissolved in a suitable solvent. Examples of solvents which can be used, and which can also be used in admixture, include those which can also be used for the synthesis of the oligo- and/or polyester resin. The oligo- and/or polyester or oligo- and/or polyesters can thus be placed in the reaction vessel as the solution which was obtained during their production. Other suitable solvents can also be used, however. For example, customary lacquer solvents are suitable, such as those which can also be used subsequently in aqueous coatin, medium (I). Examples of solvents in the presence of which the (meth) acrylic copolymer can be produced include glycol ethers such as butyl glycol, butyl diglycol, dipropylene glycol dimethyl ether, dipropylene glycol monomethyl ether, ethylene glycol dimethyl ether or polyethylene glycol-di-n-butyl ether; glycol ether esters such as ethyl glycol acetate, butyl glycol acetate, butyl diglycol acetate or methoxypropyl acetate; esters such as butyl acetate or amyl acetate; ketones such as methyl ethyl ketone, methyl isobutyl ketone or cyclohexanone; alcohols, such as ethanol, propanol or butanol, aromatic hydrocarbons such as xylene or Solvesso 100 (registered Trade Mark for a mixture of aromatic hydrocarbons with a boiling range of 155 to 185° C.), and aliphatic hydrocarbons.

Hydrophobic constituent a) of the (meth)acrylic copolymers of component A) is produced by the copolymerisation of monomers based on esters of unsaturated carboxylic acids, such as (meth)acrylic acid, itaconic acid, maleic acid, fumaric acid and crotonic acid, which comprise at least one secondary hydroxyl group in their alcohol part, in the presence of one or more oligo- and/or polyesters. The alcohol component of the ester monomers based on unsaturated carboxylic acids preferably contains 3 to 25 carbon atoms.

Examples of hydrophobic monomers comprising secondary OH functions include: hydroxypropyl (meth)acrylate, addition products of glycidyl (meth)acrylate and saturated, short-or long-chain fatty acids comprising C1–C20 alkyl radicals, e.g. acetic acid, propionic acid, butanoic acid, caproic acid, lauric acid, palmitic acid or stearic acid, as well as addition products of Cardura E (a glycidyl ester of versatic acid) with unsaturated COOH-finctional compounds, such as (meth)acrylic acid, itaconic acid, maleic acid, fumaric acid or crotonic acid for example.

Hydrophilic constituent b) of the (meth)acrylic copolymers of component A) is produced by the copolymerisation of monomers based on esters of unsaturated carboxylic acids, such as (meth)acrylic acid, itaconic acid, maleic acid, fumaric acid and crotonic acid, which comprise at least one primary hydroxyl group in their alcohol part, in the presence of one or more oligo- and/or polyesters. The alcohol component of the ester monomers based on unsaturated carboxylic acids may contain 2 to 18 carbon atoms, for example.

Examples of monomers for the synthesis of the hydrophilic constituent of component A) include: hydroxyalkyl esters of (meth)acrylic acid which contain a primary OH group in the C2–C3 hydroxyalkyl radical, such as hydroxyethyl (meth)acrylate, as well as hydroxyalkyl esters of (meth)acrylic acid which contain a primary OH group in the C4–C8 hydroxyalkyl radical, such as butanediol mono (meth)acrylate, hydroxyhexyl (meth)acrylate, hydroxyoctyl (meth)acrylate and the reaction products of hydroxyethyl (meth)acrylate with caprolactone.

Hydrophilic constituents b) of the (meth)acrylic copolymers of component A) also contain carboxyl groups, for the introduction of which carboxyl-functionalised monomers are used in conjunction, such as (meth)acrylic acid, itaconic acid and crotonic acid for example. Other carboxyl-functionalised monomers which can be used are semi-esters which are produced by the addition of saturated aliphatic alcohols such ethanol, propanol or butanol to maleic anhydride.

Other comonomers which are free from OH groups can be used in conjunction for the production of the (meth)acrylic copolymers of component A). Examples thereof include (cyclo)alkyl (meth)acrylates (alkyl and/or cycloalkyl (meth) acrylates) such as ethylhexyl (meth)acrylate, octyl (meth) acrylate, dodecyl (meth)acrylate, lauryl (meth)acrylate, isobornyl (meth)acrylate, 4-tert.-butylcyclohexyl (meth) acrylate, methyl (meth)acrylate, ethyl (meth)acrylate, butyl (meth)acrylate, isobutyl (meth)acrylate, tert.-butyl (meth) acrylate and cyclohexyl (meth)acrylate. Aromatic vinyl compounds such as styrene, and styrene derivatives such as vinyltoluene and p-methylstyrene, can also be used in conjunction as comonomers. The quantitative proportions of these further comonomers can be selected so that the desired specifications are achieved as regards molecular weight, ratio of OH groups, OH number and acid number.

As mentioned above, production of the (meth)acrylic copolymers of component A) is effected by the copolymerisation of components a) and b) in the presence of one or more oligo- and/or polyesters. This is a copolymerisation which proceeds by a radical mechanism, and in which the amounts of monomers and of oligo- and/or polyesters are matched to each other so that the desired specifications are achieved as regards molecular weight, ratio of OH groups, OH number and acid number.

Polymerisation is conducted, for example, at temperatures between 80 and 180° C., preferably at 100 to 150° C.

Production is effected, for example, as a polymerisation which proceeds by a radical mechanism in the presence of one or more oligo- and/or polyesters and of a radical initiator such as those which are known to one skilled in the art. Examples of radical initiators include peroxides such as di-tert.-butyl peroxide, dicumyl peroxide, dibenzoyl peroxide, cumene hydroperoxide, tert.-butyl hydroperoxide, tert.-butyl perbenzoate, tert.-butyl per-2-ethylhexanoate, cyclohexanone peroxide or methyl isobutyl ketone peroxide, azo compounds such as 2,2'-azo-bis(2,4-dimethylvaleronitrile) or azo-bis-isobutyronitrile, and initiators which cleave C—C bonds, such as benzpinacol derivatives for example.

Polymerisation initiators are generally added, for example, in an amount of 0.1 to 4% by weight with respect to the amount of monomers weighed in. During polymerisation the monomers can also be added separately or at different times. The monomers or monomer mixture which is used may contain the radical initiators, or the radical initiators may be added to the monomer mixture, optionally slightly chronologically displaced or separately.

The radical-initiated polymerisation can be effected by a one-pot method, with the obtainment of a random distribution of hydrophobic and hydrophilic constituents.

For example, a procedure can be employed in which all the necessary monomers, as well as the initiator or initiators, are mixed in a supply vessel and are subsequently added over a period of several hours, e.g. 5 hours, at an elevated temperature, e.g. 140° C., and with stirring, to the oligo- and/or polyester or oligo- and/or polyesters, which are optionally present in admixture with one or more solvents. The copolymers which are thereby formed then have a random distribution of primary and secondary hydroxy groups and of carboxyl groups.

However, it is also possible to carry out a block polymerisation in order to obtain (meth)acrylic copolymers comprising hydrophobic and hydrophilic blocks. The customary procedure can be used for the production of block copolymers. For example, mixtures of hydrophobic monomers (optionally together with other comonomers) can first be polymerised, whereupon hydrophilic monomers (optionally with comonomers) are then added and further polymerised. It is possible in practice, for example, firstly to add a mixture of hydrophobic, hydroxy-functional monomers, esters of (meth)acrylic acid, and optionally aromatic vinyl compounds also, and subsequently to add a further mixture of hydrophilic, hydroxy-functional monomeric esters of (meth)acrylic acid, aromatic vinyl compounds and carboxy-functional monomers.

The aqueous coating media (I) which can be used in the process according to the invention may contain, as component B), one or more different binder vehicles in a quantitative proportion of up to 20% by weight with respect to the binder vehicle solids. Examples include (meth)acrylic copolymer resins, polyester resins or even polyurethane resins which are different from A) and which are stabilised anionically in the form of carboxyl groups and/or non-ionically in the form of polyoxyalkylene groupings. These binder vehicles which are different from A) may be pure thermoplastics or may comprise hydroxyl groups which are suitable for crosslinking. Component B) includes special pigment grinding resins in particular. An example of a paste resin which is based on an anionically stabilised polyurethane resin and which can preferably be used in aqueous coating medium (I) within the scope of the present invention is given in DE-A-40 00 889. Aqueous coating media (I) preferably contain no other binder vehicles B) apart from components A) and C) and the special grinding resins of component B) which are optionally present.

The aqueous coating media (I) which can be used in the process according to the invention contain, as crosslinking component C), 15 to 50% by weight with respect to the binder vehicle of one or more free or blocked polyisocyanates and/or one or more triazine-based crosslinking components which form ether and/or ester groups with the hydroxyl groups of component A). The free or blocked polyisocyanates and/or the triazine crosslinking agents may be present in dissolved or dispersed form in the aqueous phase and/or dissolved or dispersed in the binder vehicle phase or dispersed in aqueous coating media (I). The aqueous coating media (I) which can be used in the process according to the invention preferably contain, as crosslinking component C), a combination of crosslinking agents comprising one or more blocked polyisocyanates and one or more triazine-base components which crosslink with the hydroxyl groups of component A) with the formation of ether and/or ester groups, and preferably contain these in a ratio of solids by weight of 20–60 parts by weight of blocked polyisocyanates to 80–40 parts by weight of triazine crosslinking agents.

The polyisocyanates which can be contained individually or in admixture in aqueous coating media (I) which can be used in the process according to the invention can be any organic diand/or polyisocyanates comprising aliphatically, cycloaliphatically, araliphatically, and/or, less preferably, aromatically bonded isocyanate groups, which are liquid at room temperature or which are liquefied or dissolved by the addition of organic solvents, and which generally have a viscosity at 23° C. of 0.5 to 2000 mPa.s, preferably greater than 1 and less than 1000 mPa.s, most preferably less than 200 mPa.s. The preferred isocyanates are those which contain about 3 to about 36, particularly about 8 to 15, carbon atoms. Examples of suitable diisocyanates include toluene diisocyanate and diphenylmethane diisocyanate and particularly hexamethylene diisocyanate, tetramethyl-xylylene diisocyanate, isophorone diIsocyanate, dicyclohexylmethane diisocyanate and cyclohexane diisocyanate.

Polyisocyanates which contain hetero atoms in the radical linking the isocyanate groups can also be used. Examples thereof include polyisocyanates which contain carbodiimide groups, allophanate groups, isocyanurate groups, urethane groups, acylated urea groups or biuret groups. These polyisocyanates preferably possess an isocyanate functionality higher than 2, such as polyisocyanates of the uretdione or isocyanurate type which are produced by the diand/or trimerisation of the aforementioned diisocyanates, for example. Other examples include polyisocyanates containing biuret groups which are produced by the reaction of the aforementioned diisocyanates with water, or low molecular weight polyisocyanates containing urethane groups which are produced by reaction with polyols.

Examples of polyisocyanates which are very suitable are "lacquer polyisocyanates" based on hexamethylene diisocyanate or on isophorone diisocyanate and/or dicyclohexylmethane diisocyanate, particularly those which are based exclusively on hexamethylene diisocyanate. The term "lacquer polyisocyanates" which is used to describe the basis of these polyisocyanates is to be understood to mean the derivatives of these diisocyanates which comprise biuret, urethane, uretdione and/or isocyanurate groups and which are known in the art.

Other polyisocyanates which are suitable are the known prepolymers which contain terminal isocyanate groups, such as those which can be obtained in particular by the reaction of the aforementioned simple polyisocyanates, mainly diisocyanates, with sub-stoichiometric amounts of organic compounds comprising at least two groups which are capable of reacting with isocyanate groups. The prepolymers of this type which are preferably used are those which comprise at least two amino groups and/or hydroxyl groups in total and which have a number average molecular weight of 300 to 10,000, preferably 400 to 6000. The corresponding polyhydroxyl compounds are preferred, e.g. hydroxy polyester, hydroxy polyether and/or acrylate resins containing hydmxy groups which are known in the art in polyurethane chemistry.

In these known prepolymers, the ratio of isocyanate groups to hydrogen atoms which are reactive towards isocyanate ranges from 1.05 to 10:1, and is preferably 1.1 to 3:1 wherein the hydrogen atoms preferably originate from hydroxyl groups. Moreover, the type and quantitative ratios of the starting materials used for the production of these NCO prepolymers are preferably selected so that the NCO prepolymers have an average NCO functionality of 2 to 4, preferably 2 to 3, and a number average molecular weight of 500 to 10,000, preferably 800 to 4000.

It is also possible to use copolymers of the vinylically unsaturated monoisocyanate dimethyl-m-isopropenylbenzyl isocyanate as a polyisocyanate, such as those which are described, amongst other topics, in DE-A-41 37 615.

The polyisocyanates can be used in free or blocked form as crosslinking agents in aqueous coating media (I). In blocked form they are blocked with the customary volatile, monovalent blocking agents which are employed in lacquer chemistry and which are subsequently split off again under stoving conditions. Examples thereof include acidic CH compounds such as acetylacetone, or acidic CH esters such as ethyl acetoacetate or dialkyl malonates; (cyclo)aliphatic alcohols such as n-butanol, furfurol, 2-ethylhexanol or cyclohexanol; phenols such as cresol or tert.-butyl phenol; dialkylamino alcohols such as dimethylaminoethanol; oximes such as methyl ethyl ketoxime, acetone oxime or cyclohexanone oxime; lactams such as epsilon-caprolactam or pyrrolidone-2; imides such as phthalimide; hydroxyalkyl ester, hydroxamic acids and esters thereof, N-alkylamides such as methylacetamide, imidazoles such as 2-methylimidazole, pyrazoles such as 2,3-dimethylpyrazole or triazoles. Mixtures of these blocking agents can be used. The preferred blocking agents for the polyisocyanates are acidic CH esters and/or oximes, particularly diethyl malonate, ethyl acetoacetate, acetone oxime and butanone oxime.

The polyisocyanates can be blocked with the same or different blocking agents within one molecule. Mixtures of differently blocked polyisocyanates can also be used.

These free or blocked polyisocyanates can be added as such during the production of aqueous coating medium (I), for example by stirring them in or by incorporating them by emulsification. In the course of the latter procedure the dissolved or dispersed binder vehicle can take over the function of an emulsifier for the added polyisocyanate. It can be advantageous if an added emulsifier is employed or if the free or blocked polyisocyanates are pre-diluted with an organic solvent which is miscible with water. In this connection, solvents are used which are inert to isocyanate groups, particularly if free polyisocyanates are used. Examples include solvents which contain no active hydrogen, such as diethylene glycol diethyl ether, dipropylene glycol dimethyl ether, butyl glycol acetate, butyl diglycol acetate, methoxypropyl acetate or most preferably N-methylpyrrolidone.

Polyisocyanates which are also suitable include hydrophilic polyisocyanates which are free or which are blocked as described above, and which are stabilised in the aqueous phase by a sufficient number of anionic groups and/or by terminal or lateral polyether chains. Anionically and/or non-ionically stabilised hydrophilic polyisocyanates are familiar to one skilled in the art. They are known from the extensive patent literature, for example. Polyisocyanates which can be dispersed in water are sold by the Bayer company as commercial products under the trade names BayhydurR LS 2025 and LS 2032. These can also be diluted with the aforementioned solvents.

If the polyisocyanates are used in their free form, aqueous coating media (I) which can be used in the process according to the invention are two-component coating media, i.e. the finished coating medium (I) is stored separately from the free polyisocyanate. If free polyisocyanates are used, these are preferably not mixed with finished coating media (I)

until shortly before the application thereof. This can be effected, for example, by means of a two-component mixing installation which is customary for the mass-production lacquer coating of automobiles, or a procedure can be used such as that which is known from EP-A-0 685 544.

Triazine-based components C) which crosslink with the hydroxyl groups of component A) with the formation of ether groups comprise customary amino resins in particular, such as alkylated condensates which are produced by the reaction of aminotriazines and amidotriazines with aldehydes. Examples include triazines such as melamine or benzoguanamine, which are condensed with aldehydes, particularly formaldehyde, by known industrial methods in the presence of alcohols such as methanol, ethanol, propanol, butanol or hexanol.

The preferred examples of these crosslinking agents are customary melamine resins, such as methyl-etherified melamine resins, e.g. the commercial products Cymel 325, Cymel 327, Cymel 350 and Cymel 370, and Maprenal MF 927. Other examples of melamine resins which can be used include butanol- or isobutanol-etherified melamine resins such as the commercial products Setarnin US 138 or Maprenal MF 610; mixed etherified melamine resins which are etherified both with butanol and with methanol, such as Cymel 254, and particularly hexamethoxymethyl melamines (HMMM) such as Cymel 30, or Cymel 303, wherein the latter melamines may be necessary for crosslinking an external acid catalyst such as p-toluenesulphonic acid for example. Acid catalysts of this type may optionally be ionically or non-ionically blocked with amines or epoxy compounds.

Triazine-based components C) which crosslink with the hydroxyl groups of component A) with the formation of ester groups are transesterification crosslinking agents, particularly transesterification crosslinking agents which react with the hydroxyl groups of component A) with the formation of urethane groups (carbamic acid ester groups), such as tris(alkoxycarbonylamino)triazine, for example, which is preferred and which is described in EP-A-0 604 922.

Components A) and C) and optionally B) can be mixed with each other, neutralised and emulsified, for example. It is also possible firstly to neutralise component A) and optionally B) and subsequently to mix them with crosslinking component C), whereupon water is added.

In practice, for example, a procedure can be used in which a solvent-containing component A), optionally plus B), is substantially freed from solvents if required, preferably by distillation under reduced pressure. The batch is then partially or completely neutralised with bases. Customary lacquer bases can be used for this purpose, such as ammonia or organic amines such as triethylamine, N-methylmorpholine, amino alcohols such as dimethylisopropanolamine, dimethylethanolamine, triethanolamine or 2-amino-2-methyl-propanol-1. Component C) can then likewise be added to component A), optionally plus B), before deionised water is added to the resin mixture, optionally with intensive mixing. In the course of this procedure, the production of the dispersion can be assisted by heating the aqueous phase. High-speed stirrers or rotor/stator mixers are suitable as mixer units, for example. It is also possible to improve the degree of dispersion by using high-pressure or ultrasonic homogenisers. The process can be carried out continuously or batch-wise.

It is also possible partially or completely to neutralise hybrid binder vehicle A), optionally plus B), optionally after they have been substantially freed from solvents, and to dilute them with water before crosslinking components C) are added.

Alternatively, the binder vehicle, which contains components A), optionally B) and optionally C) and which is preferably at least substantially freed from solvents, can be emulsified with the aid of a customary non-ionic emulsifier. This is effected, for example, by homogenising the binder vehicle, optionally together with crosslinking agent or crosslinking agents C) and one or more non-ionic emulsifiers, optionally with heating, e.g. to temperatures of 30 to 80° C., e.g. 60° C. A mixture of this type can be emulsified in a customary homogenisation device. Examples thereof include rotor/stator homogenisers, which operate at speeds of rotation of 8000 to 10,000 revolutions per minute for example. The emulsifiers are used in amounts of 3 to 30% by weight with respect to the binder vehicle solids, for example.

Aqueous coating media (I) which can be used in the process according to the invention may contain hydroxy-functional reactive thinners, in a quantitative proportion of up to 20% by weight with respect to the binder vehicle solids, which thinners are intrinsically water-soluble or which are converted into the aqueous phase by means of external emulsifiers or by the emulsifying effect of the water-thinnable binder vehicles. These reactive thinners are compounds with a number average molecular weight (Mn) of less than 500, preferably less than 300, and an OH functionality of at least 2, preferably between 2 and 4 for example. Examples of suitable hydroxy-functional reactive thinners include alkanediols comprising 2 to 8 carbon atoms, glycerol, castor oil, which is optionally hydrogenated, trimethyloipropane, pentaerythritol, sorbitol and mannitol, as well as ethoxylation and/or propoxylation products of these polyalcohols which satisfy the above restrictions as regards their number average molecular weight.

In addition, aqueous coating media (I) which are used in the process according to the invention may contain polymer microparticles which are known to one skilled in the art. Crosslinked or un-crosslinked microparticles can be used. Examples of polymer microparticles are described in EP-A-0 038 127 and EP-A-0 234 362.

Aqueous coating media (I) may also contain lacquer technology additives, for example rheology-influencing agents such as microdispersed hydrated silica, inorganic layer silicates or polymeric urea compounds. Examples of other substances which act as thickeners include water-soluble cellulose ethers such as hydroxyethyl cellulose, methyl cellulose or carboxymethyl cellulose, as well as synthetic polymers comprising ionic groups and/or groups with an associative effect such as polyvinyl alcohol, poly (meth)acrylamide, poly(meth)acrylic acid, polyvinyl pyrrolidone, styrene, maleic anhydride- or ethylene-maleic anhydride copolymers and derivatives thereof, or ethoxylated polyurethanes or polyacrylates which have been modified to make them hydrophobic. Moreover, anti-settling agents, flow enhancers, light stabilisers (for example of the HALS type, of the benztriazole type, or micronised titanium dioxide), anti-foaming agents such as silicone-containing compounds for example, wetting agents and substances which promote bonding can also be used. Wetting agents should also be understood to include known paste resins, such as those which are described in DE-A-40 00 889 and which can be used to improve the dispersion and grinding of pigments. Additives which are insoluble in water can be admixed with the binder vehicle before conversion into the aqueous phase for example.

Aqueous coating media (I) may contain customary lacquer solvents which are miscible with water, for example in amounts which are preferably less than 20% by weight, e.g.

5 to 15% by weight. They may also contain solvents which are immiscible with water. The solvents may originate from binder vehicle components A) and optionally B) or from crosslinking component C), or they can be added separately. Examples of solvents include glycols e.g. ethylene glycol. propylene glycol and oligomers thereof; glycol ethers such as ethoxypropanol, butyl glycol, butyl diglycol, dipropylene glycol dimethyl ether, dipropylene glycol monomethyl ether, ethylene glycol dimethyl ether or polyethylene glycol di-n-butyl ether; glycol ether esters such as ethyl glycol acetate, butyl glycol acetate, butyl diglycol acetate or methoxypropyt acetate; esters such as butyl acetate or amyl acetate; ketones such as acetone, methyl ethyl ketone, methyl isobutyl ketone or cyclohexanone; alcohols such as ethanol, propanol or butanol; N-methylpyrrolidone; aromatic hydrocarbons such as xylene or Solvesso 100 (registered Trade Mark for a mixture of aromatic hydrocarbons with a boiling range of 155 to 185° C.), and aliphatic hydrocarbons.

Aqueous coating media (I) contain colour- and/or effect-imparting effect pigments and/or colour-imparting absorption pigments and optionally extenders; they preferably contain no effect pigments, however. When the process according to the invention is used on an industrial mass-production scale, aqueous coating medium (I) is preferably provided in a multiplicity of single-colour shades which determines the single-colour shade programrnme. If effect multi-layer coatings are to be produced by the process according to the invention, and if this is carried out by employing procedure a) as explained above, which is then preferred, the single-colour pigmentations of aqueous coating medium (I) are most preferably matched to the colour shade of the effect base lacquer which is applied subsequently, i.e. the colour shades of aqueous of coating medium (I) and of the effect base lacquer approximate to each other.

Examples of effect pigments which can be used in aqueous coating medium (I) include the lamellar pigments which are usually employed in effect lacquers, such as metallic pigments, e.g. of titanium, aluminium or copper, interference pigments such as metal pigments coated with metal oxides, e.g. titanium oxide-coated or mixed oxide-coated aluminium, coated mica e.g. titanium oxide-coated or mixed oxide-coated mica, micronised titanium dioxide and graphite effect pigments, lamellar iron oxide (micaceous iron oxide), molybdenum disulphide pigments, lamellar copper phthalocyanine pigments and bismuth oxychloride lamellae, coated glass flakes, as well as effect pigments which develop pronounced colour flop, particularly on dark backgrounds.

These effect pigments, which may exist as powders or in the form of a commercially available paste, are Generally first mixed with organic solvents, which are preferably water-thinnable, and additives, and are processed to form a paste. It may be advantageous to add the water-thinnable binder vehicles and/or paste resins during the production of the pastes. It should be ensured that lamellar effect pigments are not mechanically damaged on mixing Examples of colour-imparting absorption pigments and/or extenders which can be used in aqueous coating media (I) and which may be of an organic or inorganic nature include titanium dioxides, iron oxide pigments, carbon black, silicas, barium sulphate, french chalk, azo pigments, phthalocyanine pigments, quinacridone pigments, diketo-pyrrolopyrrole pigments, perylene pigments and indanthrone pigments.

The colour-imparting absorption pigments and/or extenders are generally ground in part of binder vehicle component A), in its non-aqueous state or after it has been converted into the aqueous phase. Grinding may preferably be effected in a special water-thinnable paste resin which is counted as part of component B). An example of a paste resin which is preferably used in aqueous coating medium (I) and which is based on an anionically stabilised polyurethane resin is given in DE-A-40 00 889. Grinding is carried out in customary processing units which are known to one skilled in the art. Thereafter, grinding is completed by adding the remaining proportion of the aqueous binder vehicle or of the aqueous paste resin to produce the finished ground colouring pigment composition.

Aqueous coating media (I) which are used in the process according to the invention preferably have a solids content of 15 to 55% by weight, most preferably 20 to 50% by weight. The ratio of pigment to solid resin constituent (binder vehicle solids from components A), B) and C)) in aqueous coating media (I) ranges for example from 0.03:1 to 2.5:1, preferably from 0.06:1 to 2:1, with respect to the weight of solids in each case.

Aqueous coating media (I) can be applied directly, by customary methods, to the stoved electrophoretically deposited primer. They are preferably applied, to give a dry coat thickness of 15 to 50 $\mu$m for example, by spraying, e.g. by compressed air spraying, airless spraying or high-speed rotation and are most preferably applied by electrostatic spray application (ESTA). particularly by high-speed rotation application which is assisted electrostatically.

After application, the lacquer coat formed from coating medium (I) can be stoved before it is overcoated with a clear lacquer (procedure b) as explained above). Particularly if crosslinking component C) in aqueous coating medium (I) comprises free polyisocyanate, the clear lacquer can also preferably be applied by the known wet-into-wet method, i.e. after the lacquer coat which is formed from aqueous coating medium (I) has briefly been pre-dried by ventilation at temperatures up to 80° C. In procedure b) of the process according to the invention, the lacquer coat formed from aqueous coating medium (I) is overcoated with a customary liquid or clear powder coating to give a dry coat thickness of 30 to 80, preferably 30 to 60 $\mu$m, for example, and the clear lacquer coat is stoved at temperatures of 60 to 160° C. When this procedure is employed, the coat thickness and drying conditions of the clear lacquer coat depend on the clear lacquer system used.

If the process according to the invention is to be carried out using procedure a) as explained above, namely if a two-layer coating consisting of an effect base lacquer coat and a clear lacquer coat is applied to the coating layer formed from aqueous coating medium (I), the latter can be stoved after application, as is generally effected with single-component systems and at temperatures of up to 165° C. for example, before it is overcoated with a coating layer of an effect base lacquer which determines the effect colour shade. In particular, if crosslinking component C) in coating medium (I) comprises free polyisocyanate, which corresponds to a two-component system, the subsequent effect base lacquer coat can also be applied by the known wet-into-wet method, i.e. after the lacquer coat formed from aqueous coating medium (I) has been briefly pre-dried by ventilation, e.g. at temperatures up to 80° C.

The effect base lacquer coating media which are used here are those which are usually employed for the production of effect base lacquer/clear lacquer two-layer coatings, a large number of which is known from the patent literature.

The effect base lacquers may be physically drying or may be crosslinkable with the formation of covalent bonds. Effect base lacquers which crosslink with the formation of covalent bonds may comprise self-crosslinking or externally crosslinkable systems.

The colour- and/or effect-imparting base lacquers which can be used in the process according to the invention are liquid coating media. They may be single- or multi-component coating media. Single-component coating media are preferred. These systems can be based on organic solvents, or are preferably aqueous base lacquers, the binder vehicle systems of which are stabilised in the usual manner, e.g. anionically, cationically or non-ionically.

The effect base lacquer coating media which can be used in the process according to the invention are customary lacquer systems which contain one or more customary base resins as film-forming binder vehicles. If the base resins are not self-crosslinking or self-drying, these lacquers may also contain crosslinking agents. Neither the base resin component nor the crosslinking component are subject to any restrictions. The binder vehicle/crosslinking agent systems of the effect base lacquers can be the same or similar as regards their qualitative composition. Their compositions are preferably different from those of aqueous coating media (I). Polyester, polyurethane and/or (meth)acrylic copolymer resins can be used as film-forming binder vehicles (base resins), for example.

The preferred effect base lacquers preferably contain polyurethane resins, most preferably in a proportion of up to 15% by weight with respect to the solid resin content of the effect aqueous base lacquer. The choice of crosslinking agents which are optionally contained is not critical; it depends on the functionality of the base resins, i.e. the crosslinking agents are selected in the usual manner so that they exhibit a reactive functionality which is complementary to the functionality of the base resins. Examples of complementary functionalities such as these between the base resin and the crosslinking agent include: hydroxyl/methylol ether, hydroxyl/free isocyanate, hydroxyl/blocked isocyanate, and carboxyl/epoxide. Provided that they are compatible with each other, a plurality of complementary functionalities such as these can also exist simultaneously in an effect base lacquer. The crosslinking agents which are optionally used in the effect base lacquers may be present individually or in admixture.

In addition to customary physically drying and/or chemically crosslinking binder vehicles, the effect base lacquers which are used in the process according to the invention contain effect pigments, e.g. metal pigments such as aluminium, coated mica, graphite effect pigments. lamellar iron oxide or lamellar copper phthalocyanine pigments.

The effect base lacquers preferably also contain inorganic and/or organic colouring pigments, e.g. titanium dioxide, iron oxide pigments, carbon black, azo pigments, phthalocyanine pigments or quinacridone pigments.

Aqueous coating medium (I) and the effect base lacquer are preferably matched to each other as regards their colour shades, i.e. they comprise colour shades which approximate to each other in particular.

In addition, the effect base lacquers may contain customary lacquer additives, such as extenders. catalysts, flow enhancers or anti-crater agents, and in particular may contain light stabilisers, optionally in combination with antioxidants.

Customary solvent-based effect base lacquer systems which are familiar to one skilled in the art can be used in the process according to the invention. These are known from the extensive patent literature, for example.

The effect base lacquers can be applied by customary methods. They are preferably applied to give a dry coat thickness of 10 to 40 $\mu$m, for example, which depends on their hiding power. They are applied by spraying, for example, such as compressed air spraying, airless spraying or high-speed rotation, and are preferably applied by electrostatic spray application (ESTA). particularly by electrostatic high-speed rotation application. Application of the effect base lacquer can be carried out in one or two spraying operations. In the latter case the first spraying operation is preferably carried out by means of electrostatic spray application, whilst the second spraying operation is preferably carried out by pneumatic spraying.

After application, the effect base lacquer coat, which is preferably an aqueous effect base lacquer coat, can be dried or stoved before it is overcoated with clear lacquer. The clear lacquer is preferably applied by the known wet-into-wet method, i.e. after the effect base lacquer coat has been briefly pre-dried by ventilation, e.g. at temperatures from 20 up to 80° C. The effect base lacquer coat is overcoated with a customary liquid clear lacquer or clear powder coating (a dry-into-wet application may be employed here, for example) to give a dry coat thickness of 30 to 80 $\mu$m for example, preferably of 30 to 60 $\mu$m, depending on the clear lacquer system used.

When wet-into-wet or dry-into-wet application is employed, the clear lacquer coat can then be stoved jointly with the effect base lacquer coat at temperatures up to 160° C. for example. The drying conditions used for the covering lacquer coat (effect base lacquer and clear lacquer) depend on the clear lacquer system used.

In principle, all known coating media or those which comprise transparent pigmentation are suitable as clear lacquers for the production of the third coating layer (procedure b) of the process according to the invention) or for the production of the fourth coating layer (procedure a) of the process according to the invention). These may be single- or multi-component clear lacquer coating media. They may be solvent-free (liquid or powdered clear lacquers), or they may be solvent-based systems, or they may be water-thinnable clear lacquers, the binder vehicles of which are stabilised in a suitable manner, e.g. anionically, cationically or non-ionically. The water-thinnable clear lacquer systems may be water-soluble systems or systems dispersed in water, for example emulsion systems or powder slurry systems which are familiar to one skilled in the art. The clear lacquer systems harden by chemical crosslinking during stoving, at temperatures of up to 160° C. for example.

The clear lacquers which are used in the process according to the invention are customary clear lacquer coating media which contain one or more base resins as film-forming binder vehicles. If the base resins are not self-crosslinking, they may also optionally contain crosslinking agents. Neither the base resin component nor the crosslinking component are subject to any restrictions. Polyester, polyurethane and/or poly(meth)acrylic resins can be used as filmforming binder vehicles (base resins), for example. The choice of crosslinking agents which are optionally contained is not critical; it depends on the functionality of the base resins, i.e. the crosslinking agents are selected in the usual manner so that they exhibit a reactive functionality which is complementary to the functionality of the base resins. Examples of complementary functionalities such as these between the base resin and the crosslinking agent include: carboxyl/epoxide, hydroxyl/methylol ether, hydroxyl/free isocyanate, hydroxyl/blocked isocyanate, and (meth) acryloyl/acidic CH group. Provided that they are compatible with each other, a plurality of complementary functionalities such as these can also exist simultaneously in a coating medium. The crosslinking agents which are optionally contained in the coating media may be present individually or in admixture.

In addition to chemically crosslinking binder vehicles and in addition to the crosslinking agents which are optionally present, the clear lacquers which are used in the process according to the invention may contain customary additives, such as catalysts, flow enhancers and colorants, and in particular may contain rheology control agents such as microgels, NADs (=non-aqueous dispersions) and disubstituted ureas ("sagging control agents"), as well as light stabilisers, optionally in combination with antioxidants.

The customary single (1C) and two-component (2C) non-aqueous clear lacquer systems which are familiar to one skilled in the art can be used as a clear lacquer in the process according to the invention. These are known, for example, from the extensive patent literature.

The customary single (1C) and two-component (2C) aqueous clear lacquer systems which are familiar to one skilled in the art can also be used as a clear lacquer in the process according to the invention. These are known, for example, from the extensive patent literature.

The customary clear powder coating systems which are familiar to one skilled in the art can also be used as a clear lacquer in the process according to the invention. They are known, for example, from the extensive patent literature.

The transparent coating can be applied as a single coat or in the form of a plurality of coats of the same or different transparent coating media. However, the transparent coating layer is advisedly applied from one clear lacquer coating medium only.

Electrically conductive substrates, e.g. metal substrates, are employed as the substrate for the process according to the invention. Automobile bodies or parts thereof, for example, are particularly suitable. These may consist of pretreated or untreated metal or of metal which has been provided with an electrically conductive layer. The first coating layer is deposited electrophoretically on this substrate in the usual manner. It is deposited in particular in the form of an anti-corrosion primer coat, to give a dry coat thickness which is customary for EDL primers of 15 to 30 $\mu$m, for example, and is stoved.

In procedure a) of the process according to the invention, the second coating layer, which consists of aqueous coating medium (I), which preferably comprises a single-colour pigmentation, of the effect multi-layer coating which is to be produced is applied to the substrate which is provided with the stoved EDL coat, preferably in one spraying operation, to give a dry coat thickness of 25 to 50, preferably 30 to 40 $\mu$m.

Examples of suitable spray application methods include compressed air spraying, airless spraying, and preferably electrostatic spraying (ESTA), wherein electrostatic high-speed rotation spraying constitutes the method of application which is most preferred. After a short time of pre-drying by ventilation, preferably at elevated temperatures up to 80° C., the coating layer which is formed from aqueous coating medium (I) is Generally stoved at temperatures up to 165° C., preferably up to 140° C., or is preferably pre-dried only in the case of an aqueous coating medium (I) which contains free polyisocyanate as a crosslinking agent. An effect base lacquer coat is then applied, preferably to give a dry coat thickness of 10 to 40 $\mu$m for example. After briefly pre-drying the effect base lacquer by ventilation, preferably at elevated temperatures up to 80° C., the clear lacquer is applied by the preferred wet-into-wet method to give a dry coat thickness which is customary for clear lacquer coats, of 30 to 80 $\mu$m for example, preferably 30 to 60 $\mu$m. The effect base lacquer coat and the clear lacquer coat are preferably stoved jointly. During the joint stoving of the effect base lacquer coat and the clear lacquer coat, the stoving temperature is between 80 and 160° C. for example, and is preferably less than 140° C. Further clear lacquer coats of the same or different clear lacquer coating media can optionally be applied before or after stoving.

In procedure b) of the process according to the invention, the second coating layer, which consists of aqueous coating medium (I) which preferably comprises a single-colour pigmentation, of the multi-layer coating which is to be produced is applied to the substrate which is provided with the stoved EDL coat, preferably in one spraying operation, to give a dry coat thickness of 15 to 50 $\mu$m, for example 25 to 50 $\mu$m, preferably 20 to 40 $\mu$m, for example 30 to 40 $\mu$m. Examples of suitable spray application methods include compressed air spraying, airless spraying, and preferably electrostatic spraying (ESTA), wherein electrostatic high-speed rotation spraying constitutes the method of application which is most preferred. After a short time of pre-drying by ventilation, e.g. at temperatures of 20 to 80° C. the coating layer which is formed from aqueous coating medium (I) is generally stoved, e.g. at temperatures of 80 to 165° C., preferably up to 140° C., or is preferably pre-dried only in the case of an aqueous coating medium (I) which contains free polyisocyanate as a crosslinking agent. The clear lacquer coat is then applied to give a dry coat thickness which is customary for clear lacquer coats, for example of 30 to 80 $\mu$m, preferably 30 to 60 $\mu$m. The stoving temperature for the clear lacquer coat is between 80 and 160° C. for example, and is preferably less than 140° C. Further clear lacquer coats of the same or different clear lacquer coating media can optionally be applied before or after stoving.

The process according to the invention can successfully be used for the original lacquer coating of motor vehicles. It is also possible to use the process in the sphere of automobile lacquer coating for repair purposes.

The multi-layer coatings which are produced by the process according to the invention correspond to current requirements for the lacquer coating of motor vehicles. The overall coat thickness of multi-layer coating produced by the process according to the invention can be reduced compared with the prior art, whilst maintaining a comparable overall level of properties. A reduction of the material consumed can be achieved by the saving in lacquer coats. The number of operations can be reduced.

In particular, the process according to the invention makes it possible to produce single-colour and effect multi-layer coatings which exhibit a visual surface quality which is outstanding or which is improved by comparison with multi-layer coatings obtained according to the prior art.

The flow and the covering lacquer condition are outstanding, as can be shown by determining the long- and short-wave fractions of the surface structure of the outer clear lacquer surfaces.

The use of the process according to the invention in a mass-production installation which is operated on an industrial scale can result in the utilisation of a considerable logistics advantage if it is operated under the conditions explained above.

DETAILED DESCRIPTION OF THE PREFERRED EMBODIMENTS

EXAMPLE 1 (preparation of an oligoester)

336.7 g trimethylolpropane, 366.8 g adipic acid and 197 g hexanediol were esterified at 180 to 230° C. in the melt to an acid number of 20 using hypophosphorous acid as a catalyst, and were subsequently condensed under vacuum down to an acid number of less than 1.5 mg KOH/g. The hydroxyl number of the oligoester obtained was 460 mg KOH/g.

EXAMPLE 2 (preparation of an oligoester)

534.2 g hexanediol and 464.8 g hexahydrophthalic anhydride were esterified at 180 to 230° C. in the melt to an acid number of 4.5 mg KOH/g using hypophosphorous acid as a catalyst. The hydroxyl number of the oligoester obtained was 185 mg KOH/g.

EXAMPLE 3 (preparation of an aqueous hybrid binder vehicle)

200 g butyl diglycol, 39 g of the oligoester from Example 2 and 208 g of the oligoester from Example I were placed in a reaction vessel and heated to 144° C. with stirring. A mixture comprising 378 g of an addition product of acrylic acid and the glycidyl ester of versatic acid (prepared by the reaction of 271 g of the glycidyl ester of versatic acid with 107 g acrylic acid until the epoxide groups were completely consumed), 31 g isobutyl acrylate, 38 g lauryl acrylate, 100 g hydroxyethyl acrylate, 196 g styrene, 5 g di-tert.-butyl peroxide and 14 g tert.-butyl peroctoate was added over a period of 5 hours. The batch was polymerised for a further 2 hours at 144° C. The polymer solution which was thus obtained was adjusted with dimethylethanolamine and deionised water, at 60° C. with stirring, to a degree of neutralisation of 50% and a solids content of 53% by weight.

Production of Single-colour Multi-layer Lacquer Coatings:

EXAMPLE 4 (according to the invention)

5 25.3 parts of the aqueous hybrid binder vehicle from Example 3, 3.8 parts hexamethoxymethyl melamine and 12.3 parts of a 75% by weight solution in dipropylene glycol methyl ether of an isocyanurate polyisocyanate based on hexamethylene diisocyanate which was capped with butanone oxime, with a latent NCO content of the solution of 11%, 3 parts butyl diglycol, and 5.5 parts deionised water were mixed in a dissolver. 30.7 parts of an aqueous white pigment paste based on the aqueous polyurethane resin according to an example in DE-A-40 00 889 (pigmentibinder vehicle ratio by weight 5.5:1, solids content 65.8% by weight) and 3.5 parts of an aqueous extender paste which contained french chalk and which was based on the aqueous polyurethane resin according to an example in DE-A-40 00 889 (extender/binder vehicle ratio by weight 1.8:1, solids content 47.1% by weight), as well as 1.5 parts of a customary lacquer flow enhancer, were admixed. The batch was subsequently diluted with 0.4 parts dimethylethanolamine and 14 parts deionised water. A white aqueous coating medium was obtained.

Bodywork panels, which were precoated with a commercially available cathodically depositable electro-dip lacquer (CDL, 18 μm dry coat thickness) which is used for the mass-production lacquer coating of automobiles, were suspended and were electrostatically coated with the white aqueous coating medium to give a dry coat thickness of 30 μm. After pre-drying by ventilation for 5 minutes at 80° C., the panels were stoved for 15 minutes at 165° C. Thereafter, they were overcoated with a commercially available two-component PU clear lacquer by compressed air spraying to give a dry coat thickness of 40 μm and were stoved for 20 minutes at 140° C. (object temperature).

The multi-layer coating obtained completely satisfied the requirements imposed on an automobile original lacquer coating.

EXAMPLE 5 (according to the invention)

29.9 parts of the aqueous hybrid binder vehicle from Example 3, 4.5 parts butyl diglycol and 6.5 parts deionised water were mixed in a dissolver. 36.2 parts of an aqueous white pigment paste based on the aqueous polyurethane resin according to an example in DE-A-40 00 889 (pigment/binder vehicle ratio by weight 5.5:1, solids content 65.8% by weight) and 4.1 parts of an aqueous extender paste which contained french chalk and which was based on the aqueous polyurethane resin according to an example in DE-A-40 00 889 (extender/binder vehicle ratio by weight 1.8:1, solids content 47.1% by weight), as well as 1.8 parts of a customary lacquer flow enhancer, were admixed. The batch was subsequently diluted with 0.5 parts dimethylethanolamine and 16.5 parts deionised water. A white master lacquer was obtained.

Bodywork panels, which were precoated with a commercially available cathodically depositable electro-dip lacquer (CDL, 18 μm dry coat thickness) which is used for the mass-production lacquer coating of automobiles, were suspended and were electrostatically coated with a white aqueous coating medium, which was prepared immediately prior to application by mixing 100 parts of the white master lacquer obtained as above and 14.6 parts of a commercially available water-thinnable polyisocyanate (Bayhydur 2032 manufactured by Bayer, NCO content: 17.2% by weight), to give a dry coat thickness of 30 μm. After pre-drying by ventilation for 5 minutes at 80° C., the panels were overcoated with a commercially available two-component PU clear lacquer to give a dry coat thickness of 40 μm and were stoved for 20 minutes at 140° C. (object temperature).

The multi-layer coating which was obtained completely satisfied the requirements imposed on an automobile original lacquer coating.

EXAMPLE 6 (according to the invention)

Figure 1:
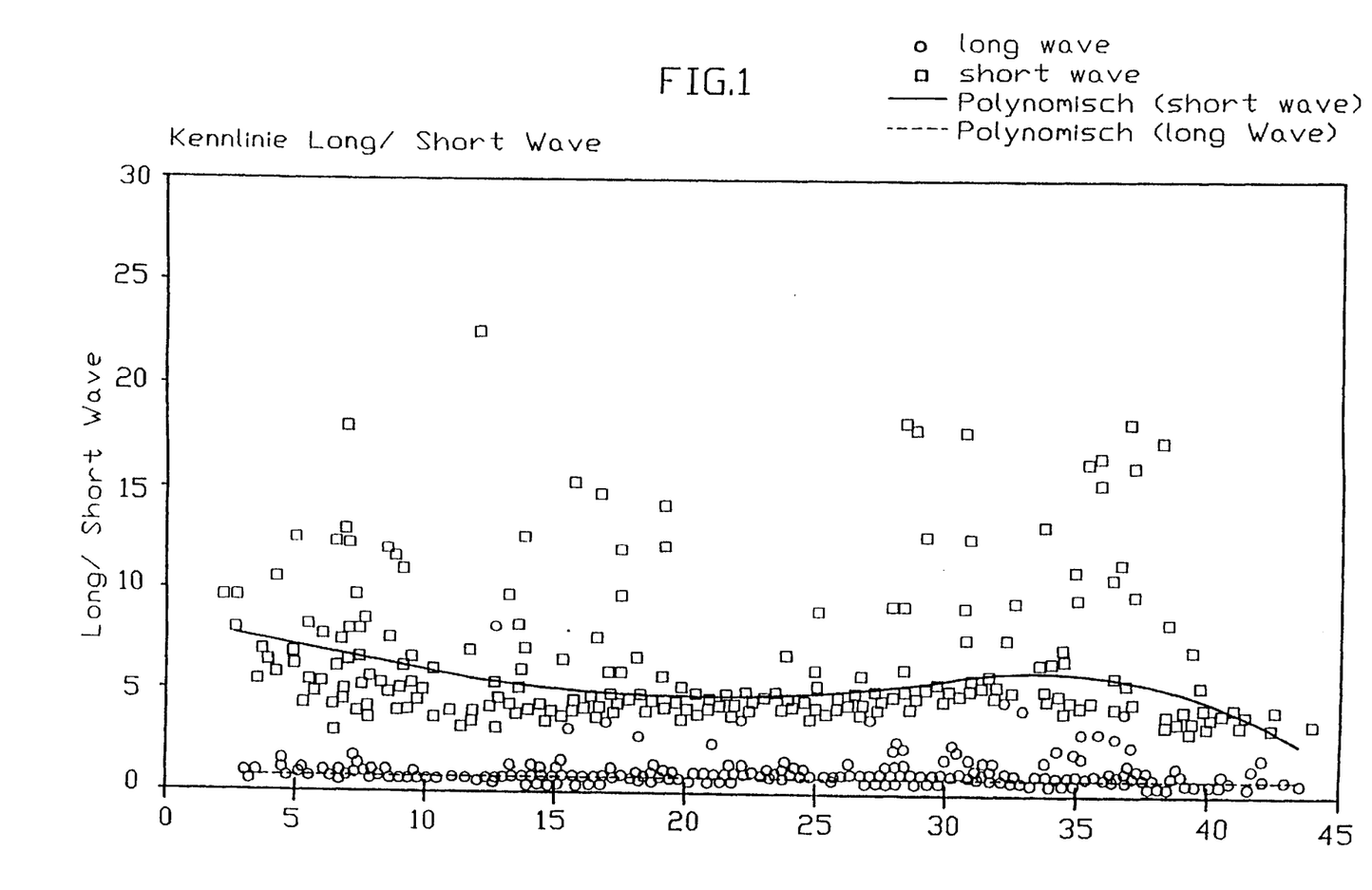
FIG. 1 is a correlation diagram on which the long wave and short wave readings of an outer clear lacquer surface are plotted as a function of the coat thickness of a white lacquer coat.

Bodywork panels, which were precoated with a commercially available cathodically depositable electro-dip lacquer (CDL, 18 μm dry coat thickness) which is used for the mass-production lacquer coating of automobiles, were suspended and were electrostatically coated with the white aqueous coating medium from Example 4 as a wedge. After pre-drying by ventilation for 5 minutes at 80° C., the panels were stoved for 20 minutes at 140° C. Thereafter, they were overcoated with a commercially available two-component PU clear lacquer by compressed air spraying to give a dry coat thickness of 40 μm and were stoved for 30 minutes at 130° C. (object temperature). The accompanying FIG. 1 is a correlation diagram on which the long wave and short wave readings (long/short wave) of the outer clear lacquer surface are plotted as a function of the coat thickness of the white lacquer coat (in μm; abscissa). This correlation diagram was produced according to the procedure in German Patent Application P 196 05 520.2, using a Wavescan measuring instrument supplied by BYK-Gardner (see European Coatings Journal No. 1–2 (1995), pages 32–35).

EXAMPLE 7 (comparative example)

Figure 2:
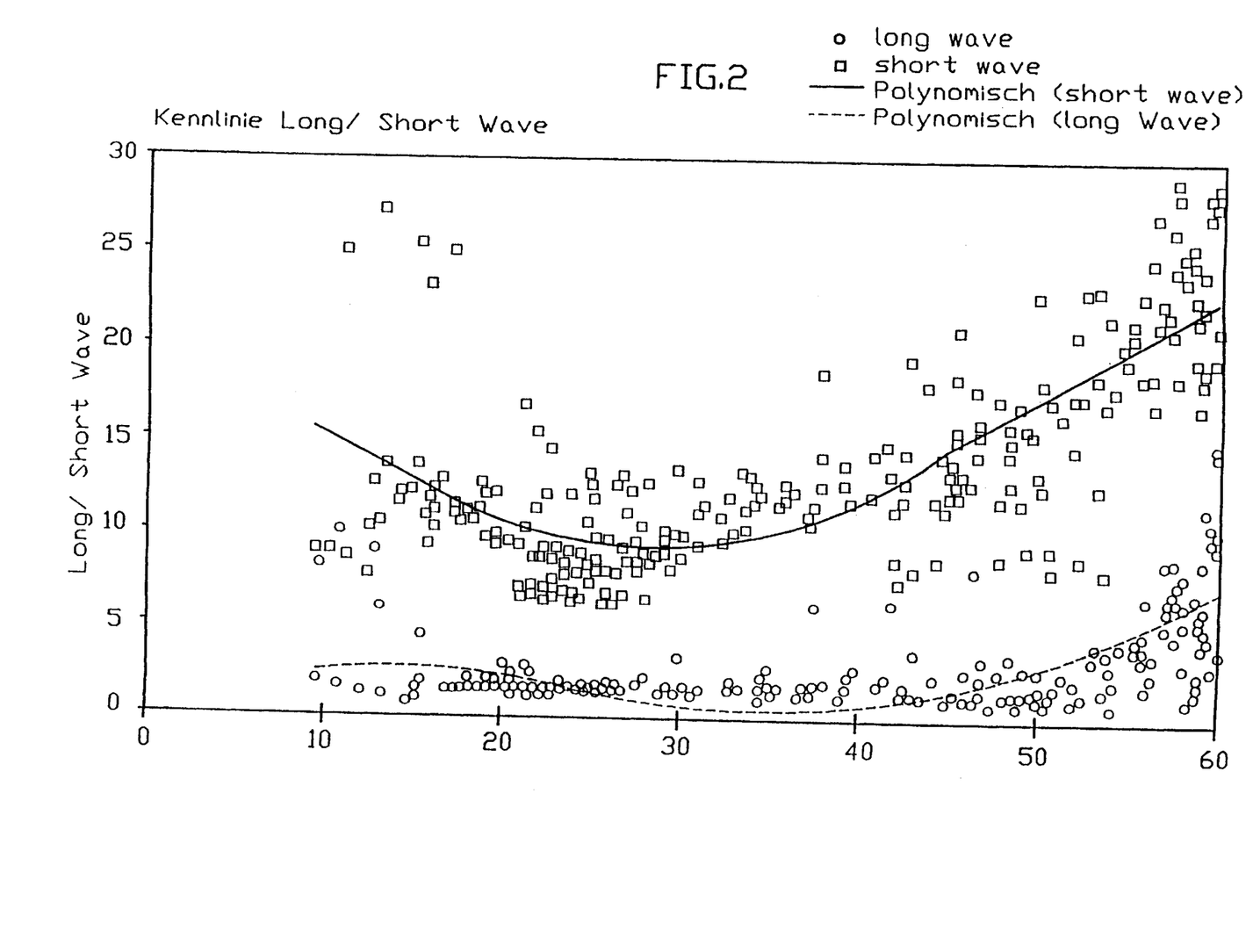
FIG. 2 is a correlation diagram on which the long wave and short wave readings of an outer clear lacquer surface are plotted as a function of the coat thickness of a white aqueous base lacquer coat.

Bodywork panels, which were precoated with a commercially available cathodically depositable electro-dip lacquer (CDL, 18 μm dry coat thickness) which is used for the mass-production lacquer coating of automobiles, and with a commercially available white primer surfacer (35 μm dry coat thickness), were suspended and were electrostatically coated with a commercially available white aqueous coating medium as a wedge. After pre-drying by ventilation for 5 minutes at 80° C., the panels were stoved for 20 minutes at 140° C. Thereafter, they were overcoated with a commercially available two-component PU clear lacquer by compressed air spraying to give a dry coat thickness of 40 μm and were stoved for 30 minutes at 130° C. (object temperature). The accompanying FIG. 2 is a correlation diagram on which the long wave and short wave readings (long/short wave) of the outer clear lacquer surface are plotted as a function of the coat thickness of the white aqueous base lacquer coat (in μm; abscissa). This correlation diagram was produced according to the procedure in German Patent Application P 196 05 520.2, using a Wavescan measuring instrument supplied by BYK-Gardner.

Production of Effect Multi-layer Lacquer Coatings

EXAMPLE 8 (according to the invention)

6 parts of the aqueous polymer dispersion according to DE-A-36 28 124, production example 1, 16 parts of an aqueous polyurethane dispersion according to DE-A-42 24 617, production example 2, and 17.5 parts of deionised water were mixed in a dissolver. 6.5 parts of an acidic acrylate thickener which was neutralised with dimethylethanolamine, 2 parts of a wetting agent and 2 parts butyl glycol were subsequently homogeneously stirred in. 20 parts of an aqueous aluminium effect pigment paste based on the aqueous polyurethane dispersion according to DEA-42 24 617, production example 2, and on the aqueous polymer dispersion according to DEA-36 28 124, production example 1, in a ratio by weight of solids of 1.2:1 (pigment/binder vehicle ratio by weight 0.8:1, solids content 29% by weight, solvent content: 20% by weight butyl glycol and 5% by weight N-methylpyrrolidone) and 2 parts polypropylene glycol (hydroxyl number 280 mg KOH/g) were admixed. The batch was subsequently diluted with 24 parts of deionised water and 4 parts n-butanol. A silver-coloured effect aqueous base lacquer was obtained. Bodywork panels, which were precoated with a commercially available cathodically depositable electro-dip lacquer (CDL, 18 μm dry coat thickness) which is used for the mass-production lacquer coating of automobiles, were suspended and were electrostatically coated with the white aqueous coating medium from Example 4 to give a dry coat thickness of 30 μm. After pre-drying by ventilation for 5 minutes at 80° C., the panels were stoved for 15 minutes at 165° C.

The silver-coloured effect base lacquer was applied by compressed air spraying to the stoved white lacquer coat in a vertical position to give a dry coat thickness of 10 μm. After pre-drying by ventilation for 5 minutes at 80° C. the panel was overcoated with a commercially available two-component PU clear lacquer to give a dry coat thickness of 40 μm and was stoved for 20 minutes at 140° C. (object temperature).

The multi-layer coating which was obtained completely satisfied the requirements imposed on an automobile original lacquer coating.

Measurements were made on the panel which was produced in this manner, and which was provided with a multi-layer coat structure according to the invention, using a "Wave-Scan" measuring instrument sold by BYK-GARDNER (see European Coatings Journal No. 1–2 (1995), pages 32–35). The value of the long wave reading which was obtained for the outer clear lacquer surface was 16.9, and the short wave reading for this surface was 13.6.

EXAMPLE 9 (comparative example)

Example 8 was repeated, with the difference that a commercially available white aqueous primer surfacer was used instead of the white aqueous coating medium from Example 4.

The multi-layer coating which was obtained completely satisfied the requirements imposed on an automobile original lacquer coating.

Measurements were made on the panel which was produced in this manner, and which was provided with a typical effect lacquer coat structure as used in automobile mass-production, using the "Wave-Scan" measuring instrument sold by BYK-GARDNER. The value of the long wave reading which was obtained for the outer clear lacquer surface was 30.8, and the short wave reading for this surface was 16.9.

What is claimed is:

1. A process for the multi-layer lacquer coating of an electrically conductive substrate comprising:

applying a primer coat by electrophoresis;

stoving the primer coat;

applying directly to the stoved primer coat at least one coating layer selected from the group consisting of a colour-imparting coating layer, an effect-imparting coating layer and a colour- and effect-imparting coating layer; and overcoating the coating layer;

wherein the coating layer is produced from an aqueous coating medium which contains at least one pigment selected from the group consisting of colouring pigments, effect pigments, an coloring and effect pigments and which contains, as binder vehicles:

A) 50 to 85% by weight of one of more hybrid binder vehicles based on polyesters and on (meth)acrylic copolymers with a hydroxyl number of 100 to 350 mg KOH/g and an acid number of 20 to 60 mg KOH/g, B) 0 to 20% by weight of one or more of binder vehicles which are different from A), and C) 15 to 50% by weight of one or more free or blocked polyisocyanates and/or one or more triazine-based components which crosslink with the hydroxyl groups of component A) with the formation of ether and/or ester groups, and wherein the sum of components A), B) and C) adds up to 100% by weight of binder vehicle solids, and wherein at least 50% by weight of the (meth)acrylic copolymers of component A) have been produced in the presence of at least 20% by weight of the polyester or polyesters of component A).

2. A process according to claim 1, wherein the coating layer is overcoated with an effect-imparting and optionally colour-imparting base lacquer coat and the base lacquer coat is further overcoated with a clear lacquer coat.

3. A process according to claim 2, wherein the coating layer which is directly applied to the stoved primer coat comprises a colour-imparting pigmentation and is overcoated with a base lacquer coat which comprises an effect-imparting pigmentation.

4. A process according to claim 2, wherein the base lacquer coat is colour- and effect-imparting and its colour shade is matched to that of the coating layer which is directly applied to the stoved primer coat.

5. A process according to claim 1, wherein the coating layer is overcoated with a clear lacquer coat.

6. A process according to claim 1, wherein hybrid binder vehicles A) comprise 30 to 95% by weight of (meth)acrylic copolymers and 5 to 70% by weight of polyesters.

7. A process according to claim 1, wherein hybrid binder vehicles A) have a hydroxyl number of 120 to 200 mg KOH/g.

8. A process according to claim 1, wherein hybrid binder vehicles A) have an acid number of 25 to 40 mg KOG/g.

9. A process according to claim 1, wherein hybrid binder vehicles A) are obtainable by the polymerisation by a radical mechanism of one or more esters of unsaturated carboxylic acids comprising hydrophobic and hydrophilic constituents, in the presence of one or more hydroxy-functional polyesters, wherein the hydrophobic constituents are based on monomeric esters of unsaturated carboxylic acids which comprise secondary OH groups and which can be present in admixture with comonomers which are free from OH groups, and the hydrophilic constituents are based on monomeric esters of unsaturated carboxylic acids which comprise primary OH groups and which can be present in admixture with comonomers which are free from OH groups.

10. A process according to claim 1, wherein it is carried out for the mass-production lacquer coating of substrates.

11. A process according to claim 1, wherein it is carried out for the mass-production lacquer coating of motor vehicles or parts thereof.

12. A process according to claim 1, wherein the process is carried out for mass-production lacquer coating of single-colour and effect-imparting coated substrates, and wherein the aqueous coating medium having a single-colour pigmentations is applied to the oiler coat in a mass-production lacquer coating installation and is overcoated with a clear lacquer or with an effect-imparting base lacquer and subsequently overcoated with a clear lacquer.

13. A process according to claim 12, wherein the effect-imparting base lacquer also contains colour-imparting pigments and its colour shade is matched to that of the coating medium of single-colour pigmentation.

14. A process according to claim 12, wherein hybrid binder vehicles A) comprises 30 to 95% by weight of (meth)acrylic copolymers and 5 to 70% by weight of polyesters.

15. A process according to claim 12, wherein hybrid binder vehicles A) have a hydroxyl number of 120 to 200 mg KOH/g.

16. A process according to claim 12, wherein hybrid binder vehicles A) have an acid number of 25 to 40 mg KOH/g.

* * * * *

UNITED STATES PATENT AND TRADEMARK OFFICE
CERTIFICATE OF CORRECTION

PATENT NO. : 6,080,296
DATED : June 27, 2000
INVENTOR(S) : LIEVERZ et al.

It is certified that error appears in the above-identified patent and that said Letters Patent is hereby corrected as shown below:

Column 9, line 38, change "0II" (both occurrences) to --OH--;

Column 11, line 60, change "hydmxy" to --hydroxy--;

Column 13, line 25, change "Cymel 30" to --Cymel 301--;

Column 21, line 42, change "5 25.3" to --25.3--; and

Column 26, line 8, change "oiler" to --primer--.

Signed and Sealed this

Eighth Day of May, 2001

*Attest:*

NICHOLAS P. GODICI

*Attesting Officer*     *Acting Director of the United States Patent and Trademark Office*